No. 746,292. PATENTED DEC. 8, 1903.
A. N. CLARK.
FILTER.
APPLICATION FILED MAR. 4, 1903.

NO MODEL.

Witnesses
Frank S. Dewire
May F. Ritchie

Allison N. Clark, Inventor,
by Frank H. Allen
Attorney

No. 746,292. Patented December 8, 1903.

UNITED STATES PATENT OFFICE.

ALLISON N. CLARK, OF PLAINVILLE, CONNECTICUT.

FILTER.

SPECIFICATION forming part of Letters Patent No. 746,292, dated December 8, 1903.

Application filed March 4, 1903. Serial No. 146,176. (No model.)

*To all whom it may concern:*

Be it known that I, ALLISON N. CLARK, a citizen of the United States, residing at Plainville, in the county of Hartford and State of Connecticut, have invented a new and useful Improvement in Filters, of which the following is a specification.

The chief object of this invention is to provide in convenient and serviceable form a filter in which the water is compelled to follow a circuitous course, and is thus subjected to the action of the filtering material for a longer period of time than is possible in most of the filters of this class now in use.

Briefly described, my improved filter, as here illustrated, consists of an outer and an inner cylindrical shell and a helical partition between said shells, the helical space between the adjacent portions of said partition being packed with some suitable filtering material. Mounted upon each end of the said outer shell is a cap or head that is threaded to screw upon an ordinary faucet or bib-cock, and said shells are further provided with openings adapted to direct the water into and out of the said helically-arranged filtering material.

Figure 1:
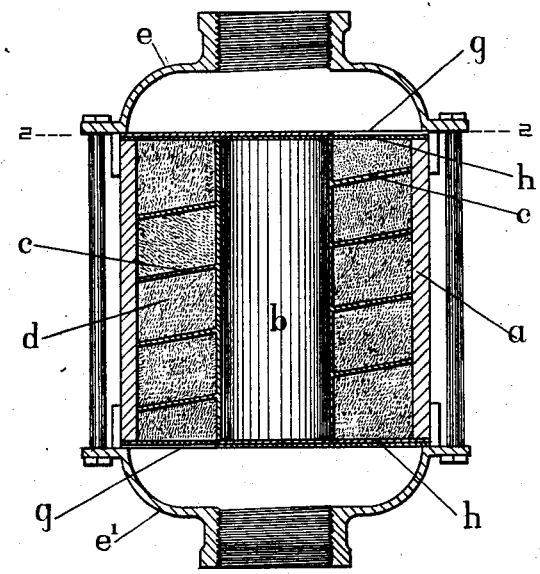
Figure 2:
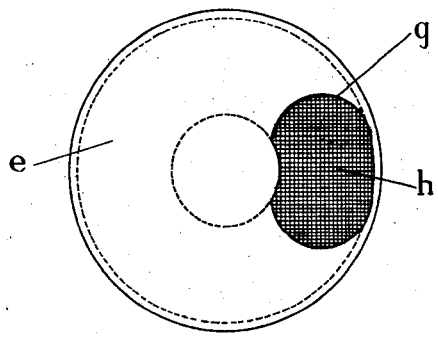

The drawings annexed hereto illustrate a filter embodying my present improvements, Figure 1 being a central longitudinal sectional view of such a filter. Fig. 2 is a cross-sectional view of a like filter, taken on the line 2 2 of Fig. 1.

Referring to the drawings, the letter *a* indicates a cylinder of glass, metal, or other suitable material forming the outer shell or casing of said filter, and *b* denotes a similar shell of lesser diameter located within and concentric with the outer shell *a*.

*c* indicates a partition arranged helically between the two shells *a b*, and *d* indicates charcoal, ground bone, gravel, or some other suitable filtering material that is packed between the coils of the partition *c*.

Upon the opposite ends of the casing *a* are heads *e e'*, that are threaded internally, so as to be readily screwed upon a faucet or bib-cock, the inner portion of each head being formed with an opening *g*, that registers with the entrance to or the exit from the helically-arranged filtering material.

When assembling the parts of my described filter, I preferably interpose a sheet of wire screen or perforate metal *h* between the heads and the body of the filter in order that the filtering material may be retained within the helical chamber.

When in service, my new filter is screwed upon the delivery end of a faucet, and when said faucet is opened the water passes through the hole *g* in the head and is caused to follow the helically-arranged filtering material, and is thus subjected to the action of said material until the delivery end of the filtering-chamber is reached, when said water (which is then thoroughly cleansed of all impurities) is discharged through the lower head.

Should my described filter become clogged and fouled by reason of long-continued use, it may be cleansed and renewed by simply reversing the position of the said filter on the faucet.

My said filter may be as cheaply produced as many, if not all, of the filters of this class now in use, and in contradistinction to such ordinary filters mine retains the water in contact with the filtering material for a much greater length of time, resulting in a more complete cleansing of said water.

Having thus described my invention, I claim—

As an improved article of manufacture, a reversible filter consisting of two concentric non-pervious cylindrical walls, a helical partition disposed between said walls, filtering material within the helical way thus provided, heads arranged at opposite ends of the outer cylinder and having threaded nipples, means connecting said heads, said heads having their inner portions provided with oppositely-disposed openings registering with the entrance to and exit from the helically-disposed filtering material, and foraminous plates between the heads and the body of the filter and extending over said openings, all substantially as and for the purpose specified.

In testimony whereof I have signed my name to this specification in the presence of two subscribing witnesses.

ALLISON N. CLARK.

Witnesses:
ALBERT A. TAYLOR,
R. B. HOLMES.